United States Patent
Choi et al.

(10) Patent No.: US 12,041,293 B2
(45) Date of Patent: Jul. 16, 2024

(54) DISPLAY DEVICE AND METHOD OF OPERATING THE SAME

(71) Applicant: SAMSUNG ELECTRONICS CO., LTD., Suwon-si (KR)

(72) Inventors: Kilsoo Choi, Suwon-si (KR); Sehyun Kim, Suwon-si (KR); Jongin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/941,871

(22) Filed: Sep. 9, 2022

(65) Prior Publication Data

US 2023/0124904 A1    Apr. 20, 2023

Related U.S. Application Data

(63) Continuation of application No. PCT/KR2022/011576, filed on Aug. 4, 2022.

(30) Foreign Application Priority Data

Oct. 20, 2021 (KR) .................... 10-2021-0140485

(51) Int. Cl.
*H04N 21/431* (2011.01)
*H04N 21/422* (2011.01)
(Continued)

(52) U.S. Cl.
CPC ... *H04N 21/4312* (2013.01); *H04N 21/42221* (2013.01); *H04N 21/43635* (2013.01); *H04N 21/4432* (2013.01)

(58) Field of Classification Search
CPC ......... H04N 21/4312; H04N 21/42221; H04N 21/43635; H04N 21/4432
(Continued)

(56) References Cited

U.S. PATENT DOCUMENTS 9,588,642 B2 *  3/2017  Terazono .......... H04M 1/72457
10,031,637 B2    7/2018  Kang et al.
(Continued)

FOREIGN PATENT DOCUMENTS

JP    2017-184065     10/2017
JP    6754542 B1      8/2020
(Continued)

OTHER PUBLICATIONS

Search Report and Written Opinion dated Nov. 14, 2022 issued in International Patent Application No. PCT/KR2022/011576.

*Primary Examiner* — Nnenna N Ekpo
(74) *Attorney, Agent, or Firm* — Nixon & Vanderhye P.C.

(57) ABSTRACT

Provided is a display device including: a wireless communicator comprising wireless communication circuitry, an inputter/outputter comprising input/output circuitry, a display, a memory storing one or more instructions, and a processor configured to execute the one or more instructions stored in the memory, wherein the processor is configured to control the display device to: receive a power on signal through the wireless communicator or the inputter/outputter, display a first screen in response to the power on signal, determine whether a control operation is being performed based on a controller corresponding to a peripheral device by analyzing information about a source image received from the peripheral device through the inputter/outputter while the first screen is displayed, and close the first screen, and control the display to display a second screen including the source image, based on determining that the control operation is being performed based on the controller.

19 Claims, 11 Drawing Sheets

(51) Int. Cl.
*H04N 21/4363* (2011.01)
*H04N 21/443* (2011.01)

(58) Field of Classification Search
USPC .......................................................... 725/37
See application file for complete search history.

(56) References Cited

U.S. PATENT DOCUMENTS

| | | |
|---|---|---|
| 10,924,794 B2 | 2/2021 | Lim et al. |
| 11,317,169 B2 | 4/2022 | Choi et al. |
| 2017/0048577 A1* | 2/2017 | Chiou .................... G08C 23/04 |
| 2017/0272681 A1* | 9/2017 | Oh .................. H04N 21/42204 |
| 2020/0294465 A1 | 9/2020 | Ozawa |
| 2022/0377406 A1* | 11/2022 | Park .................. H04N 21/4122 |

FOREIGN PATENT DOCUMENTS

| | | |
|---|---|---|
| JP | 2020-148798 | 9/2020 |
| JP | 7286603 B2 | 6/2023 |
| KR | 10-2004-0021950 | 11/2004 |
| KR | 10-2005-0043969 | 5/2005 |
| KR | 10-0876231 | 12/2008 |
| KR | 10-2009-0017163 | 2/2009 |
| KR | 10-2009-0019094 | 2/2009 |
| KR | 10-2011-0012481 | 2/2011 |
| KR | 10-2013-0018010 | 2/2013 |
| KR | 10-2014-0098514 | 8/2014 |
| KR | 10-2019-0023315 | 3/2019 |
| KR | 10-2019-0041690 | 4/2019 |
| KR | 10-2220108 B1 | 2/2021 |

\* cited by examiner

DISPLAY DEVICE AND METHOD OF OPERATING THE SAME

CROSS-REFERENCE TO RELATED APPLICATIONS

This application is a continuation of International Application No. PCT/KR2022/011576 designating the United States, filed on Aug. 4, 2022, in the Korean Intellectual Property Receiving Office and claiming priority to Korean Patent Application No. 10-2021-0140485, filed on Oct. 20, 2021, in the Korean Intellectual Property Office, the disclosures of which are incorporated by reference herein in their entireties.

BACKGROUND

Field

The disclosure relates to a display device and a method of operating the same. For example, the disclosure relates to a display device connected to a peripheral device to display a source image received from the peripheral device, and a method of operating the same.

Description of Related Art

A display device is a device having a function of displaying an image that a user may view. The user may view a broadcast on the display device. The display device displays, on a display thereof, a broadcast selected by the user from among broadcast signals transmitted from broadcasting stations. Furthermore, a smart television (TV) capable of providing various contents in addition to the broadcast signals is provided. The smart TV does not passively operate based on selection of the user, but analyzes and provides what the user wants without manipulation by the user.

Meanwhile, when the display device such as a TV is connected to a peripheral device such as a set-top box, a Blu-ray disc player, a digital versatile disc (DVD) player, a streaming device, or a home theater, the display device may receive an image from the peripheral device and display the received image.

The TV has a home menu screen provided by the TV itself, and the home menu screen is automatically executed when the TV is turned on. For example, when the TV is turned on using a peripheral device remote controller other than a TV remote controller while the peripheral device is connected to the TV, the home menu screen is automatically executed. In this case, the user may not close the automatically executed home menu screen using the peripheral device remote controller.

SUMMARY

Embodiments of the disclosure provide a display device capable of automatically closing a home menu screen provided by the display device, when a power on signal is generated by a controller corresponding to a peripheral device connected to the display device, and a method of operating the same.

According to an example embodiment of the disclosure, a display device includes: a wireless communicator comprising communication circuitry, an inputter/outputter comprising input/output circuitry, a display, a memory storing one or more instructions, and a processor configured to execute the one or more instructions stored in the memory to control the display device to: receive a power on signal through the wireless communicator or the inputter/outputter, display a first screen in response to the power on signal, determine whether a control operation is being performed based on a controller corresponding to a peripheral device by analyzing information about a source image received from the peripheral device through the inputter/outputter while the first screen is displayed, and close the first screen, and control the display to display a second screen including the source image, based on determining that the control operation is being performed based on the controller.

The first screen may include a home menu screen corresponding to the display device.

The processor may be further configured to execute the one or more instructions to control the display device to: close the first screen and display the second screen, based on a first time elapsing while the first screen is displayed, in response to the power on signal received from the peripheral device through the inputter/outputter.

The processor may be further configured to execute the one or more instructions to control the display device to: close the first screen based on a second time elapsing while the first screen is displayed, in response to the power on signal received through the wireless communicator, and the second time may be longer than the first time.

The power on signal received through the wireless communicator may be received using an infrared (IR) communication method.

The inputter/outputter may include a high-definition multimedia interface (HDMI), and the power on signal received through the inputter/outputter may be received through HDMI consumer electronics control (CEC).

The processor may be further configured to execute the one or more instructions to control the display device to: determine that the control operation is being performed based on the controller, based on at least one of a change in channel information included in the source image, display of a home menu screen corresponding to the peripheral device, display of a channel change user interface (UI), or display of a volume change UI being detected in the source image.

The processor may be further configured to execute the one or more instructions to control the display device to: detect the change in channel information by recognizing at least one of a logo image, a channel name, a broadcasting station name, or a channel number included in the source image.

According to an example embodiment of the disclosure, a method of operating a display device includes: receiving a power on signal through communication circuitry of a wireless communicator or circuitry of an inputter/outputter, displaying a first screen in response to the power on signal, determining whether a control operation is being performed based on a controller corresponding to a peripheral device, by analyzing information about a source image received from the peripheral device through the inputter/outputter while the first screen is displayed, and closing the first screen and displaying a second screen including the source image, based on determining that the control operation is being performed based on the controller.

A display device according to an example embodiment of the disclosure may close a home menu screen based on a control signal generated by a controller corresponding to a peripheral device without using a controller corresponding to the display device, thereby enhancing user convenience.

When the display device is turned on using the controller corresponding to the peripheral device, a user of the display device may directly view a source image received from the peripheral device.

BRIEF DESCRIPTION OF DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
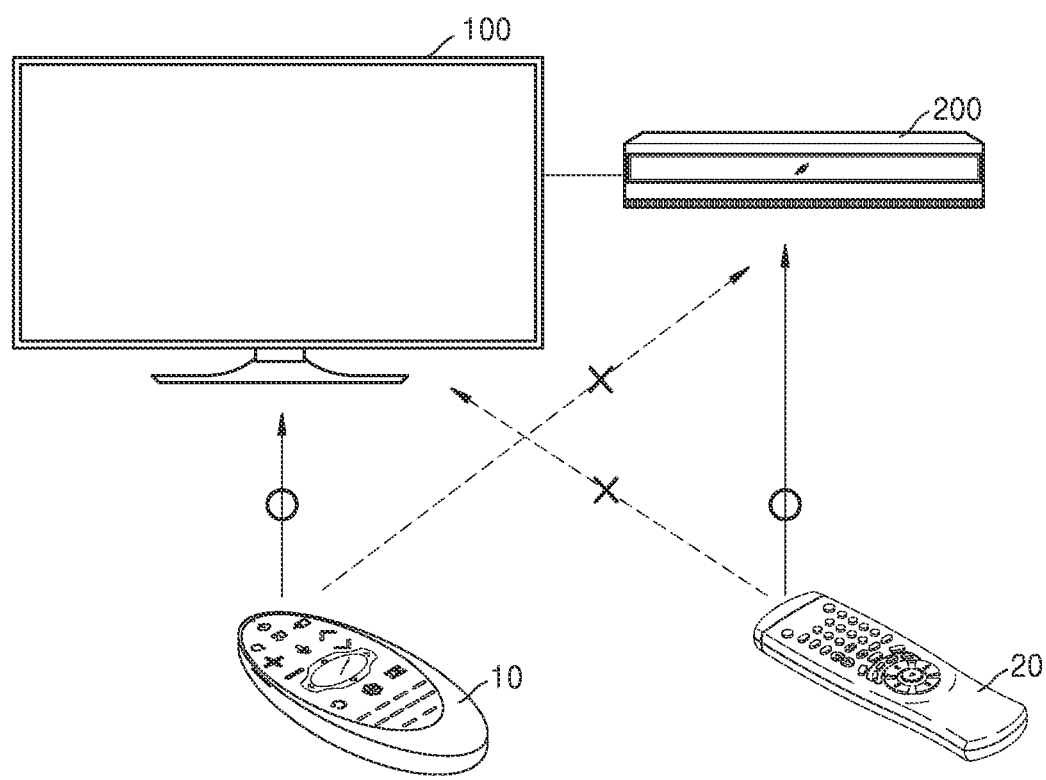
FIG. 1 is a diagram illustrating an example display device and a peripheral device according to various embodiments.

Throughout the disclosure, the expression "at least one of a, b or c" indicates only a, only b, only c, both a and b, both a and c, both b and c, all of a, b, and c, or variations thereof.

Terminology used in this disclosure will now be briefly described before describing the various example embodiments of the disclosure in greater detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this disclosure, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in greater detail with reference to the attached drawings. The disclosure may, however, be embodied in many different forms and should not be construed as being limited to the various example embodiments of the disclosure set forth herein. In the drawings, parts not related to the disclosure may not be illustrated for clarity of explanation, and like reference numerals denote like elements throughout.

As used herein, the term "user" refers to a person who controls a system, functions, or operations, and may include a developer, a manager, or an installer.

The term 'image' or 'picture' may refer to a still image, a moving image including a plurality of consecutive still images (or frames), or a video.

FIG. 1 is a diagram illustrating an example display device 100 and a peripheral device 200 according to various embodiments.

Referring to FIG. 1, the display device 100 according to an embodiment of the disclosure may be a television (TV), but the TV is merely a non-limiting example and the display device 100 may be implemented in various forms including a display. For example, the display device 100 may be implemented in various forms such as, for example, and without limitation, a mobile phone, a tablet personal computer (PC), a digital camera, a camcorder, a laptop computer, a desktop computer, an e-book reader, a digital broadcast receiver, a personal digital assistant (PDA), a portable multimedia player (PMP), a navigation system, an MP3 player, and a wearable device.

The display device 100 may be a stationary electronic device installed at a fixed location or a mobile electronic device carriable by a user, or be a digital broadcast receiver capable of receiving digital broadcast signals. In particular, embodiments of the disclosure may be easily implemented in a display device having a large display, e.g., a TV, but are not limited thereto.

The display device 100 may be implemented not only as a flat display device but also as a curved display device having a curvature or a flexible display device having an adjustable curvature. An output resolution of the display device 100 may include, for example, high definition (HD), full HD (FHD), ultra HD (UHD), or a resolution higher than UHD.

The peripheral device 200 according to an embodiment of the disclosure may be a device for providing contents to the display device 100. For example, the contents may refer to multimedia contents, and include images, video data, audio data, text, games, and applications, but are not limited thereto.

The peripheral device 200 according to an embodiment of the disclosure may include, for example, and without limitation, a set-top box, a Blu-ray disc player, a digital versatile disc (DVD) player, a game machine, a digital camera, a camcorder, a streaming device, a home theater, an audio device, or the like. The peripheral device 200 may include various electronic devices such as, for example, and without limitation, a smartphone, a tablet PC, a mobile device, a video phone, an e-book reader, a desktop PC, a laptop PC, a netbook computer, a PDA, a PMP, a navigation system, an MP3 player, and a wearable device.

The display device 100 and the peripheral device 200 according to an embodiment of the disclosure may be connected to each other through wired or wireless communication. For example, the display device 100 may be connected to the peripheral device 200 through a high-definition multimedia interface (HDMI) port, a mobile high-definition link (MHL) port, a universal serial bus (USB) port, a display port (DP), a Thunderbolt port, a video graphics array (VGA) port, an RGB port, a D-subminiature (D-SUB), a digital visual interface (DVI), a component jack, or a PC port. The display device 100 and the peripheral device 200 may transmit or receive video data, audio data, and additional information therebetween.

The display device 100 may be connected to the peripheral device 200 through short-range wireless communication such as wireless local area network (WLAN) or Bluetooth communication to transmit or receive video data, audio data, and additional information therebetween.

The disclosed embodiments of the disclosure representatively assume that the display device 100 is connected to the peripheral device 200 through HDMI communication (e.g., an HDMI cable) for convenience, though it will be understood that the disclosure is not limited thereto.

When the display device 100 is connected to the peripheral device 200 through an HDMI cable, data and information may be transmitted or received therebetween using a transition minimized differential signaling (TMDS) channel, a display data channel (DDC), or consumer electronics control (CEC). For example, the TMDS channel may be used to transmit video data and audio data. The DDC channel may be used to transmit extended display identification data (EDID) (e.g., a display product type, a resolution, a screen size, and a brightness indicating display features) of the display device 100 serving as a sink device, to the peripheral device 200 serving as a source device. The display device 100 and the peripheral device 200 may be controlled by each other through CEC.

Referring back to FIG. 1, the display device 100 may receive a control signal from a first controller 10, and perform an operation corresponding to the received control signal. The first controller 10 may control the display device 100 using short-range wireless communication including infrared (IR) or Bluetooth (BT) communication. The first controller 10 may control functions of the display device 100 using at least one of keys (including buttons), a touchpad, a microphone (not shown) capable of receiving voice of a user, or a sensor (not shown) capable of recognizing motion of the first controller 10.

For example, the first controller 10 may include a power on/off button for powering on or off the display device 100, and transmit a power on/off signal to the display device 100 when the power on/off button is pressed by the user. The first controller 10 may also transmit a channel up/down signal, a volume up/down signal, or the like to the display device 100.

The peripheral device 200 may receive a control signal from a second controller 20, and perform an operation corresponding to the received control signal. Like the first controller 10, the second controller 20 may control the peripheral device 200 using short-range wireless communication including IR or BT communication. The second controller 20 may transmit a power on/off signal for powering on or off the peripheral device 200, a channel up/down signal, a volume up/down signal, or the like to the peripheral device 200.

The first controller 10 and the second controller 20 according to an embodiment of the disclosure may include different types of control code information. For example, the first controller 10 may include first control code information for controlling the display device 100, and the second controller 20 may include second control code information for controlling the peripheral device 200. As such, the display device 100 may recognize only a control signal received from the first controller 10, and may not recognize a control signal received from the second controller 20. The peripheral device 200 may recognize only a control signal received from the second controller 20, and may not recognize a control signal received from the first controller 10.

When the display device 100 is connected to the peripheral device 200 through an HDMI cable, the display device 100 and the peripheral device 200 may control each other through HDMI CEC as described above. For example, when the display device 100 is powered on using the first controller 10, the peripheral device 200 connected to the display device 100 may also be powered on and, when the display device 100 is powered off using the first controller 10, the peripheral device 200 may also be powered off.

In addition, when the peripheral device 200 is powered on using the second controller 20, the display device 100 may also be powered on and, when the peripheral device 200 is powered off using the second controller 20, the display device 100 may also be powered off. Specifically, when the peripheral device 200 receives a power on/off signal from the second controller 20, the peripheral device 200 may transmit the power on/off signal to the display device 100 using HDMI CEC. When the power on/off signal is received from the peripheral device 200 through HDMI CEC, the display device 100 may be powered on or off.

When powered on, the display device 100 according to an embodiment of the disclosure may display a home menu screen. In this case, the home menu screen may be a menu screen provided by the display device 100, and be displayed on a whole screen or a part of the screen.

The display device 100 may receive an image signal from the peripheral device 200 connected thereto through HDMI. When the display device 100 is displaying the home menu screen, an image corresponding to the image signal received from the peripheral device 200 (hereinafter referred to as a 'source image') may be displayed in a background. When the display device 100 is displaying the home menu screen on the whole screen, the source image being displayed in the background is not displayed on the display device 100. When the display device 100 is displaying the home menu screen on a part of the screen, the source image being displayed in the background may be displayed on another part of the screen of the display device 100.

In this case, to allow the user to view the source image, the home menu screen displayed on the display device 100 needs to be closed or be displayed in the background. To close the home menu screen or to display the home menu screen in the background, a control signal for closing the home menu screen need to be input to the display device 100 using the first controller 10.

However, when the peripheral device 200 is connected to the display device 100 and the user is using the second controller 20, to enhance user convenience, a method of closing the home menu screen using the second controller 20 without using the first controller 10 is required.

As such, when a power on signal is received, the display device 100 according to an embodiment of the disclosure may determine whether the power on signal is input by the first controller 10 or the second controller 20, and perform different operations when the power on signal is input by the first controller 10 and when the power on signal is input by the second controller 20. For example, when the power on signal is input by the first controller 10, the display device 100 may display the home menu screen corresponding to the display device 100, and may not perform a timeout operation for automatically closing the home menu screen after a preset time.

On the other hand, when the power on signal is input by the second controller 20, the display device 100 may not display the home menu screen corresponding to the display device 100, but display a source image received from the peripheral device 200. The display device 100 may display the home menu screen, and perform a timeout operation for automatically closing the home menu screen after a preset time.

The display device 100 according to an embodiment of the disclosure may analyze the source image received from the peripheral device 200 while the home menu screen corresponding to the display device 100 is displayed, and recognize that a control signal is input by the second controller 20, when at least one of a change in channel information included in the source image, display of a home menu screen corresponding to the peripheral device 200, display of a channel change user interface (UI), or display of a volume change UI is detected in the source image. As such, the display device 100 may close the home menu screen or display the home menu screen in the background, and display the source image received from the peripheral device 200.

Therefore, the user may close the home menu screen corresponding to the display device 100, and view the source image corresponding to the peripheral device 200, using the second controller 20 without using the first controller 10.

A detailed description thereof will now be provided with reference to the drawings.

Figure 2:
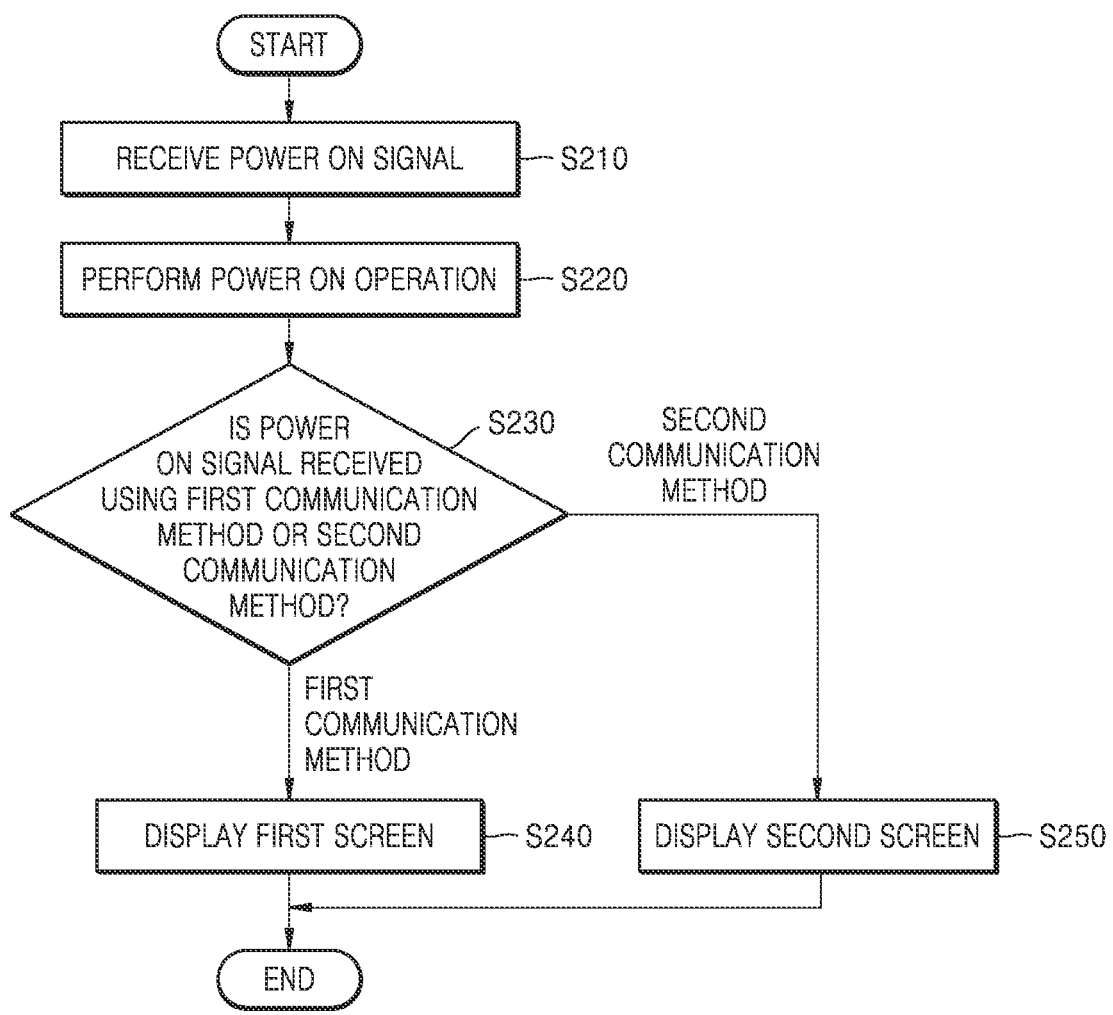
FIG. 2 is a flowchart illustrating an example method of operating a display device, according to various embodiments.

FIG. 2 is a flowchart illustrating an example method of operating the display device 100, according to various embodiments.

Referring to FIG. 2, the display device 100 according to an embodiment of the disclosure may receive a power on signal (S210).

When the power on signal is received, the display device 100 may perform a power on operation (S220). For example, the power on operation may refer to an operation of switching a display of the display device 100 from a black screen state to a state in which image data is reproducible.

The display device 100 according to an embodiment of the disclosure may operate differently when the power on signal is received using a first communication method and when the power on signal is received using a second communication method. In this case, the first communication method may refer to a case when the power on signal is received using an IR communication method through an IR module included in a wireless communicator of the display device 100. The second communication method may refer to a case when the power on signal is received using an HDMI communication method through an HDMI port included in an inputter/outputter of the display device 100. However, the first and second communication methods are not limited thereto.

When the power on signal is received using the first communication method, the display device 100 may display a first screen (S240).

For example, the case when the power on signal is received using the first communication method may include a case when the display device 100 receives the power on signal from the first controller 10. When the display device 100 receives the power on signal from the first controller 10, the display device 100 may display a home menu screen. In this case, the home menu screen may be a menu screen provided by the display device 100, and include items indicating applications installed in the display device 100, contents, functions provided by the display device 100, etc. The home menu screen may be displayed on a whole screen of the display, or a part of the screen.

When the display device 100 displays the home menu screen, a source image received from the peripheral device 200 may be displayed in a background.

On the other hand, when the power on signal is received using the second communication method, the display device 100 may display a second screen (S250).

For example, the case when the power on signal is received using the second communication method may include a case when the display device 100 receives the power on signal from the peripheral device 200 through HDMI CEC.

When the power on signal is received from the peripheral device 200, the display device 100 may not display the home menu screen corresponding to the display device 100, but display the source image received from the peripheral device 200.

When the power on signal is received from the peripheral device 200, the display device 100 may display the home menu screen corresponding to the display device 100. In this case, a timeout function may be applied to the home menu screen displayed on the display device 100. For example, when a preset time has elapsed without input of a control signal while the home menu screen is displayed on the display device 100, the display device 100 may automatically close the home menu screen or display the home menu screen in the background. When the home menu screen is closed or is displayed in the background, the display device 100 may display the source image received from the peripheral device 200.

Figure 3:
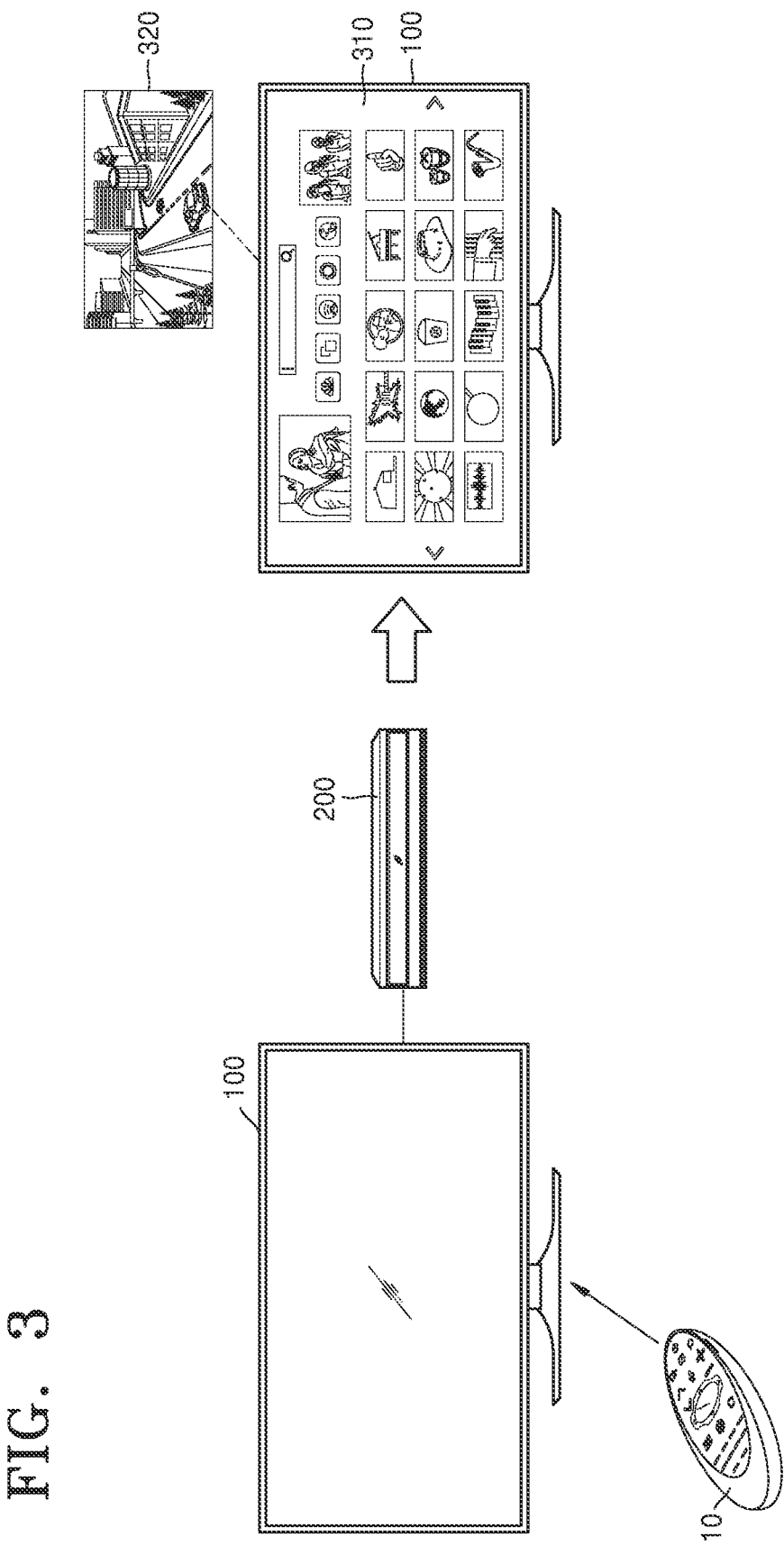
FIG. 3 is a diagram illustrating an example operation of a display device in a case when a power on signal is input by a first controller, according to various embodiments.

FIG. 3 is a diagram illustrating an example operation of the display device 100 in a case when a power on signal is input by the first controller 10, according to various embodiments.

Referring to FIG. 3, the display device 100 according to an embodiment of the disclosure may receive a power on signal from the first controller 10. For example, the first controller 10 may include a power on/off button, and transmit the power on signal to the display device 100 when the power on/off button is pressed. The first controller 10 may include a microphone to receive a voice command corresponding to 'power on', and transmit the power on signal to the display device 100 when the voice command corresponding to 'power on' is received. However, the first controller 10 is not limited thereto.

The first controller 10 according to an embodiment of the disclosure may transmit the power on signal to the display device 100 using an IR communication method. However, the first controller 10 is not limited thereto, and may transmit a control signal to the display device 100 using, for example, a WLAN (e.g., Wi-Fi), Bluetooth, Bluetooth low energy (BLE), ultrasonic, or Zigbee method.

When the power on signal is received from the first controller 10, the display device 100 may perform a power on operation. For example, the power on operation may refer to an operation of switching a display of the display device 100 from a black screen state to a state in which image data is reproducible.

The peripheral device 200 connected to the display device 100 may also be powered on. For example, the display device 100 may transmit the power on signal to the peripheral device 200 through HDMI CEC.

In addition, when the power on signal is received from the first controller 10, the display device 100 may display a home menu screen 310. In this case, the home menu screen 310 may be a menu screen provided by the display device 100, and include items indicating applications installed in the display device 100, contents, functions provided by the display device 100, etc. The home menu screen 310 may be displayed on a whole screen of the display, or a part of the screen.

When the home menu screen 310 is displayed, the display device 100 may display, in a background, a source image 320 received from the peripheral device 200. When the home menu screen 310 is displayed on the whole screen, the source image 320 may not be displayed on the display and, when the home menu screen 310 is displayed on a part of the screen, the source image 320 may be displayed on another part of the screen.

Figure 4:
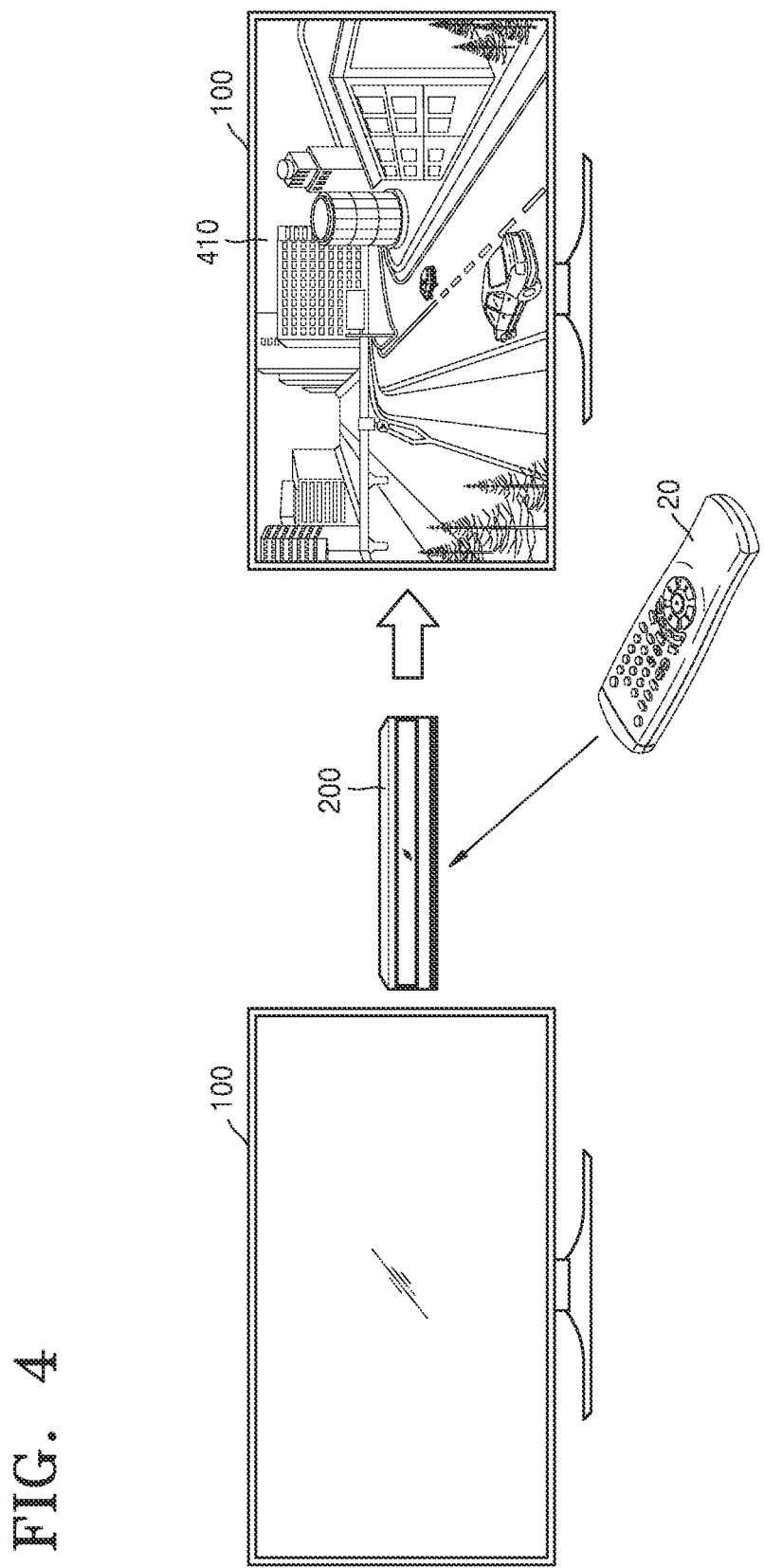
FIG. 4 is a diagram illustrating an example operation in a case when a display device receives a power on signal from a peripheral device, according to various embodiments.

FIG. 4 is a diagram illustrating an example operation in a case when the display device 100 receives a power on signal from the peripheral device 200, according to various embodiments.

Referring to FIG. 4, the display device 100 according to an embodiment of the disclosure may be connected to the peripheral device 200. In this case, the display device 100 may be connected to the peripheral device 200 through an HDMI cable.

The second controller 20 may transmit a power on signal to the peripheral device 200. For example, the second controller 20 may include control code information capable of controlling the peripheral device 200, and thus a control signal generated by the second controller 20 may be recognized only by the peripheral device 200 and may not be recognized by the display device 100.

The second controller 20 may include a power on/off button, and transmit the power on signal to the peripheral device 200 when the power on/off button is pressed. The second controller 20 may include a microphone to receive a voice command corresponding to 'power on', and transmit the power on signal to the peripheral device 200 when the voice command corresponding to 'power on' is received. However, the second controller 20 is not limited thereto.

The second controller 20 may transmit the power on signal to the peripheral device 200 using an IR communication method. However, the second controller 20 is not limited thereto, and may transmit a control signal to the peripheral device 200 using, for example, a WLAN (e.g., Wi-Fi), Bluetooth, BLE, ultrasonic, or Zigbee method.

When the power on signal is received from the second controller 20, the peripheral device 200 may be powered on. The display device 100 connected to the peripheral device 200 may also be powered on. For example, the peripheral device 200 may transmit the power on signal to the display device 100 through HDMI CEC.

When the power on signal is received from the peripheral device 200, the display device 100 may perform a power on operation. For example, the power on operation may refer to an operation of switching a display of the display device 100 from a black screen state to a state in which image data is reproducible.

The display device 100 may not display a home menu screen, but display a source image 410 received from the peripheral device 200.

As such, when the peripheral device 200 and the display device 100 are powered on using the second controller 20, a user may directly view the source image 410 without closing the home menu screen.

Figure 5:
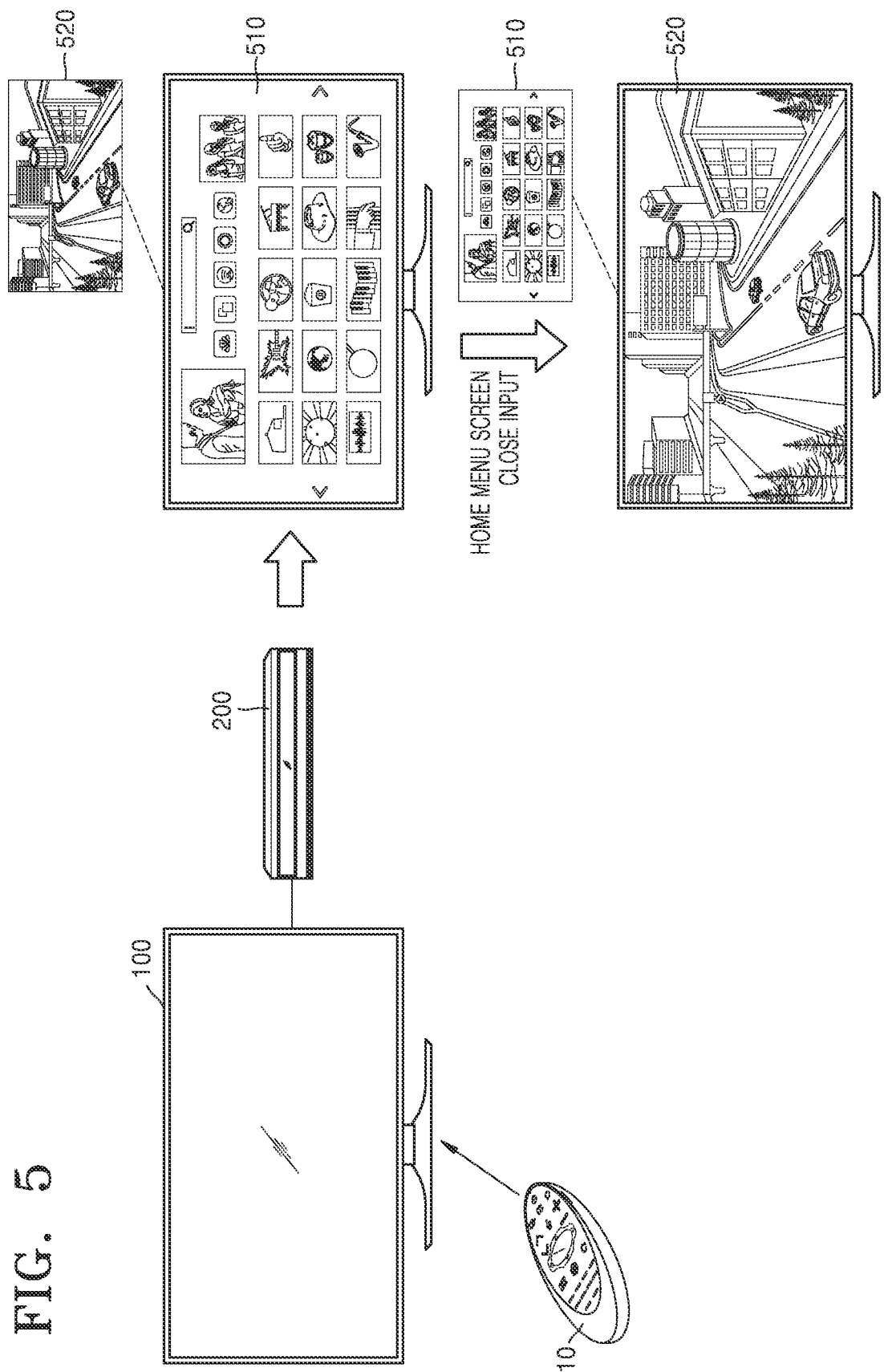
FIG. 5 is a diagram illustrating an example operation of a display device in a case when a power on signal is input by a first controller, according to various embodiments.

FIG. 5 is a diagram illustrating an example operation of the display device 100 in a case when a power on signal is input by the first controller 10, according to various embodiments.

Referring to FIG. 5, the display device 100 according to an embodiment of the disclosure may receive a power on signal from the first controller 10. The operation of receiving the power on signal from the first controller 10 is described in detail above in relation to FIG. 3, and thus a description is not repeated here.

When the power on signal is received from the first controller 10, the display device 100 may perform a power on operation. Due to the power on operation, a display of the display device 100 may be switched from a black screen state to a state in which image data is reproducible.

The peripheral device 200 connected to the display device 100 through HDMI may also be powered on.

In addition, when the power on signal is received from the first controller 10, the display device 100 may display a home menu screen 510, and display, in a background, a source image 520 corresponding to an image signal received from the peripheral device 200.

In this case, a timeout function may not be applied to the home menu screen 510 displayed on the display device 100. For example, when a control signal is not input while the home menu screen 510 is displayed on the display device 100, the display device 100 may continuously display the home menu screen 510.

When a control signal for closing the home menu screen 510 is received from the first controller 10, the display device 100 may close the home menu screen 510 or display the home menu screen 510 in the background. When the home menu screen 510 is closed or is displayed in the background, the display device 100 may display, on the display, the source image 520 received from the peripheral device 200.

Figure 6:
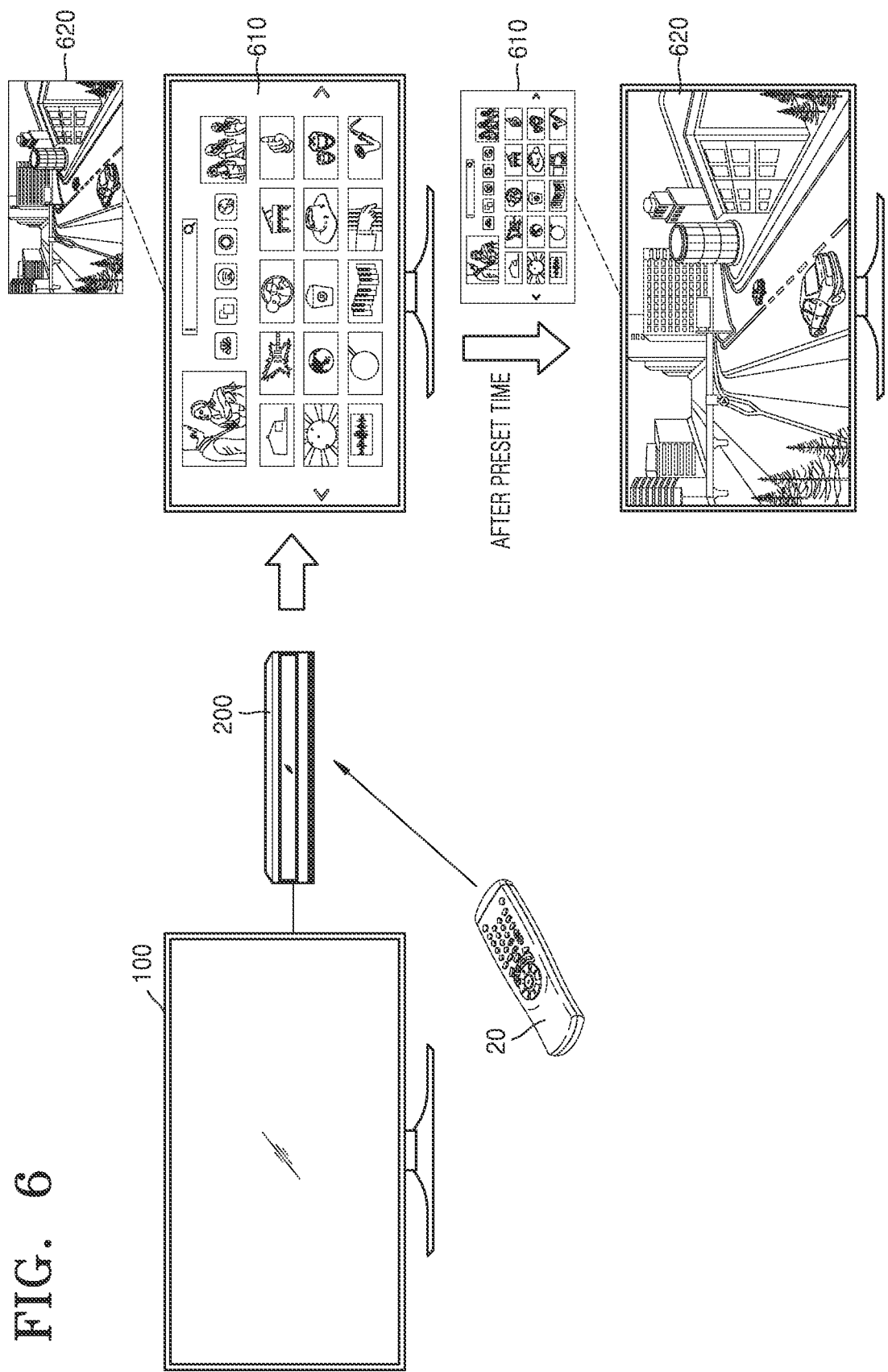
FIG. 6 is a diagram illustrating an example operation in a case when a display device receives a power on signal from a peripheral device, according to various embodiments.

FIG. 6 is a diagram illustrating an example operation in a case when the display device 100 receives a power on signal from the peripheral device 200, according to various embodiments.

Referring to FIG. 6, the display device 100 according to an embodiment of the disclosure may be connected to the peripheral device 200. In this case, the display device 100 may be connected to the peripheral device 200 through an HDMI cable.

The second controller 20 may transmit a power on signal to the peripheral device 200. The operation of receiving the power on signal from the second controller 20 is described in detail above in relation to FIG. 4, and thus a repeated description may not be provided here.

When the power on signal is received from the second controller 20, the peripheral device 200 may be powered on. The display device 100 connected to the peripheral device 200 may also be powered on. For example, the peripheral device 200 may transmit the power on signal to the display device 100 through HDMI CEC.

When the power on signal is received from the peripheral device 200, the display device 100 may display a home menu screen 610, and display, in a background, a source image 620 corresponding to an image signal received from the peripheral device 200.

A timeout function may be applied to the home menu screen 610 displayed on the display device 100. For example, when a preset time has elapsed without input of a control signal while the home menu screen 610 is displayed on the display device 100, the display device 100 may automatically close the home menu screen 610 or display the home menu screen 610 in the background. When the home menu screen 610 is closed or is displayed in the background, the display device 100 may display, on a display thereof, the source image 620 received from the peripheral device 200.

Although the display device 100 displays the home menu screen 510, to which the timeout function is not applied, in FIG. 5 when the power on signal is received from the first controller 10, the display device 100 is not limited thereto. Even when the power on signal is received from the first controller 10, the display device 100 may display a home menu screen to which the timeout function is applied (e.g., a first home menu screen). However, the display device 100 may automatically close the first home menu screen after a first time. In this case, the first time may be longer than a preset time (e.g., a second time) for automatically closing a home menu screen (e.g., a second home menu screen) displayed when the power on signal is received from the peripheral device 200 as shown in FIG. 6.

For example, when the power on signal is received from the peripheral device 200, the display device 100 may set a shorter timeout time compared to a case when the power on signal is received from the first controller 10, thereby not disturbing a user viewing the source image 620.

Figure 7:
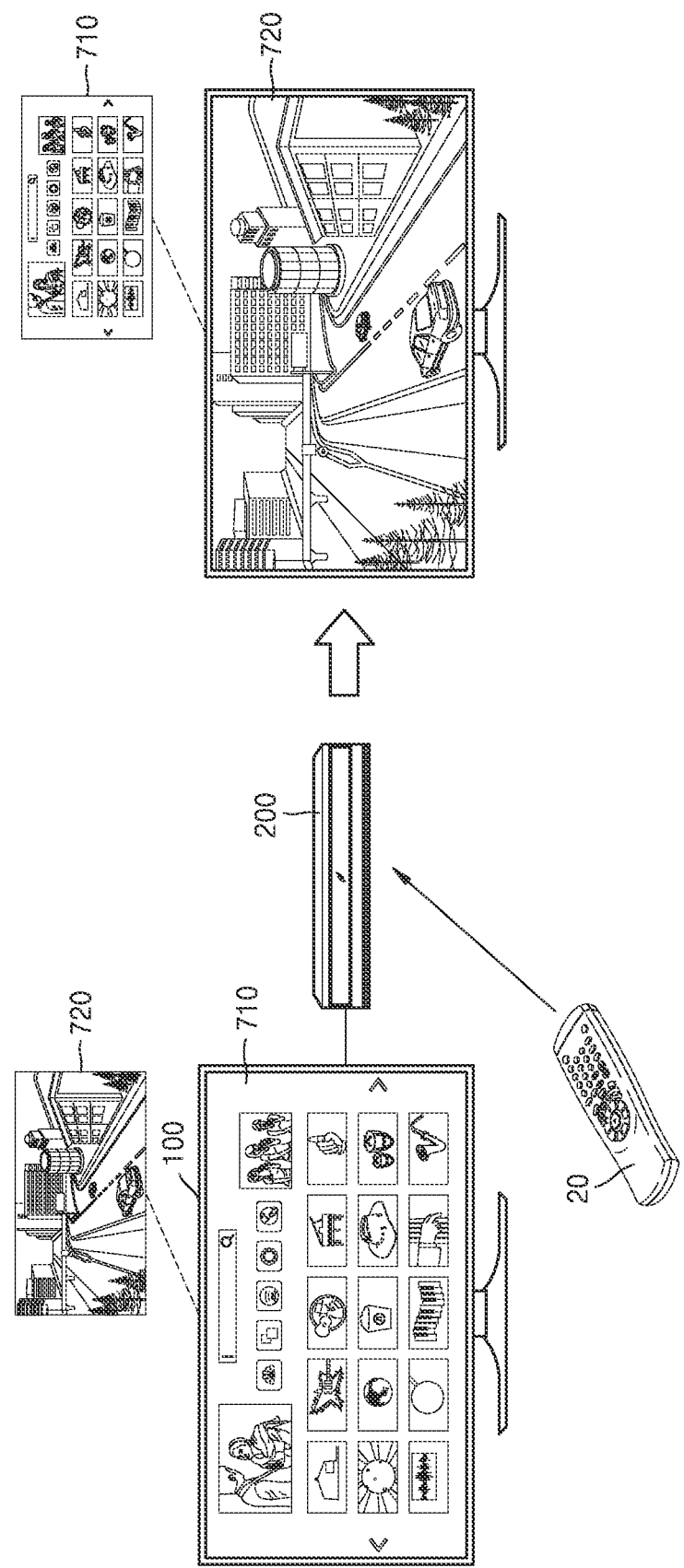
FIGS. 7 and 8 are diagrams illustrating an example operation, performed by a display device, of closing a home menu screen by analyzing a source image received from a peripheral device, according to various embodiments.
Figure 8:
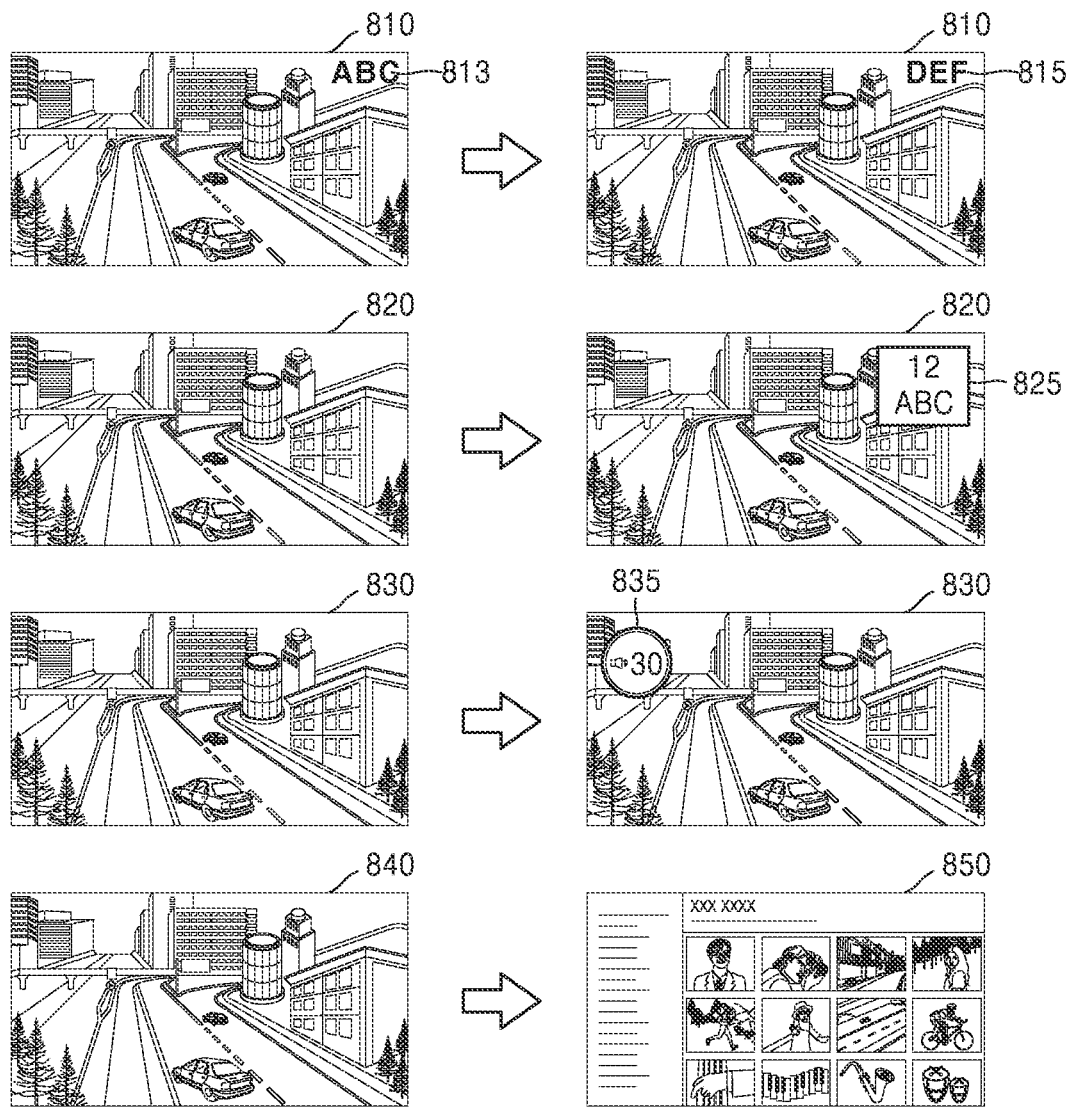

FIGS. 7 and 8 are diagrams illustrating example operations, performed by the display device 100, of closing a home menu screen by analyzing a source image received from the peripheral device 200, according to various embodiments.

Referring to FIG. 7, the display device 100 according to an embodiment of the disclosure may display a home menu screen 710. The display device 100 may receive a source image 720 from the peripheral device 200 connected thereto through HDMI, and display the source image 720 in a background.

The peripheral device 200 according to an embodiment of the disclosure may receive a control signal from the second controller 20, and perform a control operation corresponding to the received control signal. When the peripheral device 200 performs the control operation corresponding to the received control signal, the source image 720 received from the peripheral device 200 may be changed.

The display device 100 according to an embodiment of the disclosure may determine whether the peripheral device 200 is performing a control operation based on the second controller 20, by analyzing the source image 720 received from the peripheral device 200. For example, the display device 100 may detect whether channel information included in the source image 720 is changed, whether a home menu screen corresponding to the peripheral device 200 is displayed on the source image 720, whether a channel change UI is displayed on the source image 720, or whether a volume change UI is displayed on the source image 720, by analyzing the source image 720.

The display device 100 may analyze the source image 720 using optical character recognition (OCR), but is not limited thereto and may analyze the source image 720 using various methods.

The method, performed by the display device 100, of determining whether the peripheral device 200 is performing a control operation based on the second controller 20, by analyzing the source image 720 will now be described in greater detail below with reference to FIG. 8.

Referring to FIG. 8, the display device 100 according to an embodiment of the disclosure may recognize channel information included in a source image. For example, the channel information may include at least one of a logo image, a channel name, a broadcasting station name, or a channel number. The display device 100 may determine whether a channel of the source image is changed, based on the recognized channel information. For example, the display device 100 may recognize at least one of text or an image related to the channel information included in the source image. As illustrated in FIG. 8, the display device 100 may recognize text 813 (e.g., "ABC") indicating a channel name included in a source image 810, and detect that the text 813 indicating the channel name is changed to text 815 (e.g., from "ABC" to "DEF"). When the text 813 indicating the channel name included in the source image 810 is changed, the display device 100 may recognize that a channel change operation is performed by the peripheral device 200.

Because the channel change operation of the peripheral device 200 may be performed based on a control signal input by the second controller 20, when the channel information included in the source image is changed, the display device 100 may determine that a control signal is input by the second controller 20 and thus a control operation of the peripheral device 200 is performed.

When a channel change UI 825 is displayed on a source image 820, the display device 100 according to an embodiment of the disclosure may recognize that the peripheral device 200 is performing a channel change operation. The channel change UI 825 may be an object indicating current channel information (e.g., a channel number or a channel name) when the channel change operation is performed. As such, the display device 100 may recognize that the peripheral device 200 is performing a channel change operation by receiving a channel control signal from the second controller 20.

When a volume change UI 835 is displayed on a source image 830, the display device 100 according to an embodiment of the disclosure may recognize that the peripheral device 200 is performing a volume change operation. The volume change UI 835 may be an object indicating a current volume as a number when the volume change operation is being performed. As such, the display device 100 may recognize that the peripheral device 200 is performing a volume change operation by receiving a volume control signal from the second controller 20.

When a home menu screen 850 corresponding to the peripheral device 200 is displayed on a source image 840, the display device 100 according to an embodiment of the disclosure may recognize that the peripheral device 200 is executing the home menu screen 850.

The home menu screen 850 corresponding to the peripheral device 200 may be displayed based on a control signal input by the second controller 20 (e.g., input of a home menu execution button). As such, when the home menu screen 850 is displayed on the source image 840, the display device 100 may determine that a control signal is input by the second controller 20 and thus a control operation of the peripheral device 200 is performed.

Referring back to FIG. 7, when it is determined that the peripheral device 200 is performing a control operation by receiving a control signal from the second controller 20, the display device 100 according to an embodiment of the disclosure may close the home menu screen 710 or display the home menu screen 710 in the background. When the home menu screen 710 is closed or is displayed in the background, the display device 100 may display the source image 720 received from the peripheral device 200.

Figure 9:
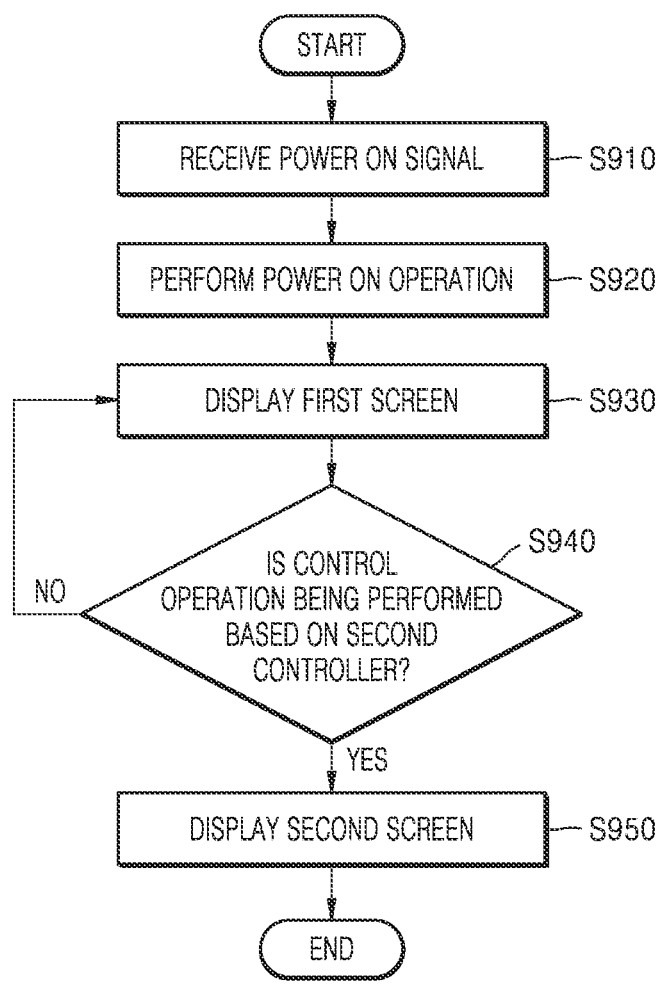
FIG. 9 is a flowchart illustrating an example method of operating a display device, according to various embodiments.

FIG. 9 is a flowchart illustrating an example method of operating the display device 100, according to various embodiments.

Referring to FIG. 9, the display device 100 according to an embodiment of the disclosure may receive a power on signal (S910).

For example, the display device 100 may receive the power on signal using an IR communication method through an IR module included in a wireless communicator. Alternatively, the display device 100 may receive the power on signal using an HDMI communication method through an HDMI port included in an inputter/outputter.

When the power on signal is received, the display device 100 may perform a power on operation (S920). For example, the power on operation may refer to an operation of switching a display of the display device 100 from a black screen state to a state in which image data is reproducible.

The display device 100 according to an embodiment of the disclosure may display a first screen (S930). In this case, the first screen may be a home menu screen provided by the display device 100, and include items indicating applications installed in the display device 100, contents, functions provided by the display device 100, etc. The home menu screen may be displayed on a whole screen of the display, or a part of the screen.

When the display device 100 according to an embodiment of the disclosure displays the first screen (e.g., the home menu screen), a source image received from the peripheral device 200 may be displayed in a background.

The display device 100 according to an embodiment of the disclosure may determine whether the peripheral device 200 is performing a control operation based on a controller of the peripheral device 200 (e.g., the second controller 20), by analyzing the source image. For example, the display device 100 may detect whether channel information included in the source image is changed, whether a home menu screen corresponding to the peripheral device 200 is displayed on the source image, whether a channel change UI is displayed on the source image, or whether a volume change UI is displayed on the source image, by analyzing the source image. However, the display device 100 is not limited thereto, and may analyze the source image using various methods.

When it is determined that the peripheral device 200 is performing a control operation based on the second controller 20, the display device 100 according to an embodiment of the disclosure may close the first screen or display the first screen in the background, and display a second screen including the source image (S950).

Figure 10:
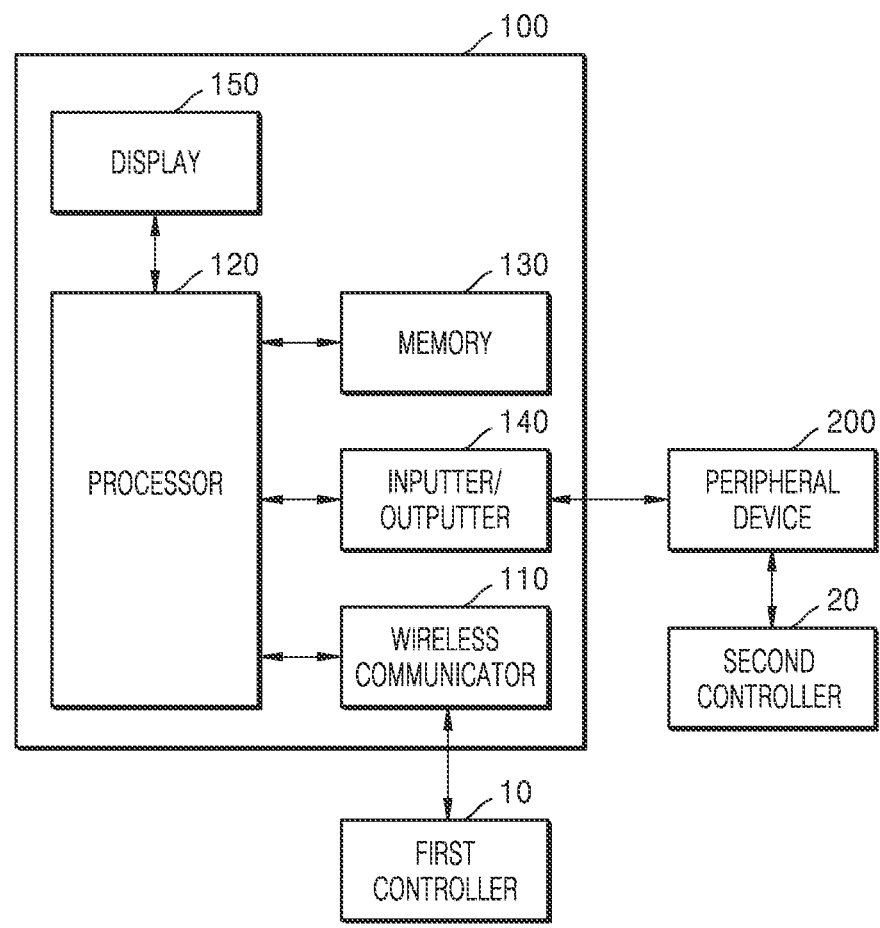
FIG. 10 is a block diagram illustrating an example configuration of a display device according to various embodiments.

FIG. 10 is a block diagram illustrating an example configuration of the display device 100 according to various embodiments.

Referring to FIG. 10, the display device 100 according to an embodiment of the disclosure may include a wireless communicator (e.g., including communication circuitry) 110, an inputter/outputter (e.g., including input/output circuitry) 140, a processor (e.g., including processing circuitry) 120, a memory 130, and a display 150.

The wireless communicator 110 according to an embodiment of the disclosure may include various wireless communication circuitry and transmit or receive data or signals through IR, Bluetooth, BLE, WLAN (e.g., Wi-Fi), ultrasonic, or Zigbee communication based on the performance and structure of the display device 100.

The wireless communicator 110 may transmit or receive signals to or from the first controller 10 under the control of the processor 120. The wireless communicator 110 may include an IR module capable of transmitting or receiving signals to or from the first controller 10 according to the IR communication standard. However, the wireless communicator 110 is not limited thereto. The wireless communicator 110 may receive, from the first controller 10, a control signal related to power on/off, channel change, volume change, or the like.

The inputter/outputter 140 according to an embodiment of the disclosure may include various input/output circuitry and transmits or receives video data (e.g., a moving image), audio data (e.g., voice or music), and additional information (e.g., an electronic program guide (EPG)) to or from outside the display device 100. For example, the inputter/outputter 140 may include an HDMI port, an MHL port, a USB port, a DP, a Thunderbolt port, a VGA port, an RGB port, a D-SUB, a DVI, a component jack, or a PC port. However, the inputter/outputter 140 is not limited thereto, and may be implemented with various configurations and operations depending on an embodiment of the disclosure.

The inputter/outputter 140 may transmit or receive data or signals to or from the peripheral device 200 under the control of the processor 120. For example, the display device 100 may be connected to the peripheral device 200 through an HDMI cable. When the display device 100 is connected to the peripheral device 200 through an HDMI cable, the inputter/outputter 140 may receive a power on signal from the peripheral device 200 through HDMI CEC, and receive a source image from the peripheral device 200 through a TMDS channel.

The processor 120 according to an embodiment of the disclosure may include various processing circuitry and controls overall operations of the display device 100 and the flow of signals between internal elements of the display device 100, and processes data.

The processor 120 may include a single core, a dual core, a triple core, a quad core, or a multiple core thereof. The processor 120 may include a plurality of processors. For example, the processor 120 may be implemented as a main processor (not shown) and a sub processor (not shown) that operates in a sleep mode.

The processor 120 may include at least one of a central processing unit (CPU), a graphics processing unit (GPU), or a video processing unit (VPU). Alternatively, depending on an embodiment of the disclosure, the processor 120 may be implemented in the form of a system on chip (SoC) which integrates at least one of the CPU, the GPU, and the VPU.

The memory 130 according to an embodiment of the disclosure may store various types of data, programs, or applications for driving and controlling the display device 100.

The program stored in the memory 130 may include one or more instructions. The program (e.g., one or more instructions) or application stored in the memory 130 may be executed by the processor 120.

When a power on signal is received, the processor 120 according to an embodiment of the disclosure may perform a power on operation. For example, the power on operation may refer to an operation of switching the display 150 from a black screen state to a state in which image data is reproducible.

The processor 120 may operate differently when the power on signal is received using a first communication method and when the power on signal is received using a second communication method. In this case, the first communication method may refer to a case when the power on signal is received using an IR communication method through the wireless communicator 110. The second communication method may refer to a case when the power on signal is received using an HDMI communication method through the inputter/outputter 140.

The processor 120 may control the display 150 to display a first screen when the power on signal is received using the first communication method, and display a second screen when the power on signal is received using the second communication method.

For example, the first screen may be a home menu screen corresponding to the display device 100, and the second screen may be a source image received from the peripheral device 200. In this case, the home menu screen may be a menu screen provided by the display device 100, and include items indicating applications installed in the display device 100, contents, functions provided by the display device 100, etc.

When the first screen is displayed on the display 150, the processor 120 may display, in a background, the source image received from the peripheral device 200.

The first screen may be a home menu screen to which a timeout function is not applied, and the second screen may be a home menu screen to which the timeout function is applied.

The processor 120 may determine whether the peripheral device 200 is performing a control operation based on the second controller 20, by analyzing the source image received from the peripheral device 200 while the home menu screen is displayed on the display 150. For example, the processor 120 may detect whether channel information included in the source image is changed, whether a home menu screen corresponding to the peripheral device 200 is displayed on the source image, whether a channel change UI is displayed on the source image, or whether a volume change UI is displayed on the source image, by analyzing the source image.

When it is determined that the peripheral device 200 is performing a control operation based on the second controller 20, the processor 120 may close the home menu screen being displayed on the display 150, or display the home menu screen in the background. When the home menu screen is closed or is displayed in the background, the processor 120 may display the source image received from the peripheral device 200.

The display 150 according to an embodiment of the disclosure generates a driving signal by converting an image signal, a data signal, an on-screen display (OSD) signal, a control signal, or the like processed by the processor 120. The display 150 may be implemented as various types, including, for example, and without limitation, a plasma display panel (PDP), a liquid-crystal display (LCD), an organic light-emitting diode (OLED), or a flexible display, or implemented as a three-dimensional (3D) display. The display 150 may be configured as a touchscreen and be used as an input device as well as an output device.

The display 150 according to an embodiment of the disclosure may display the home menu screen provided by the display device 100, or the source image received from the peripheral device 200.

Figure 11:
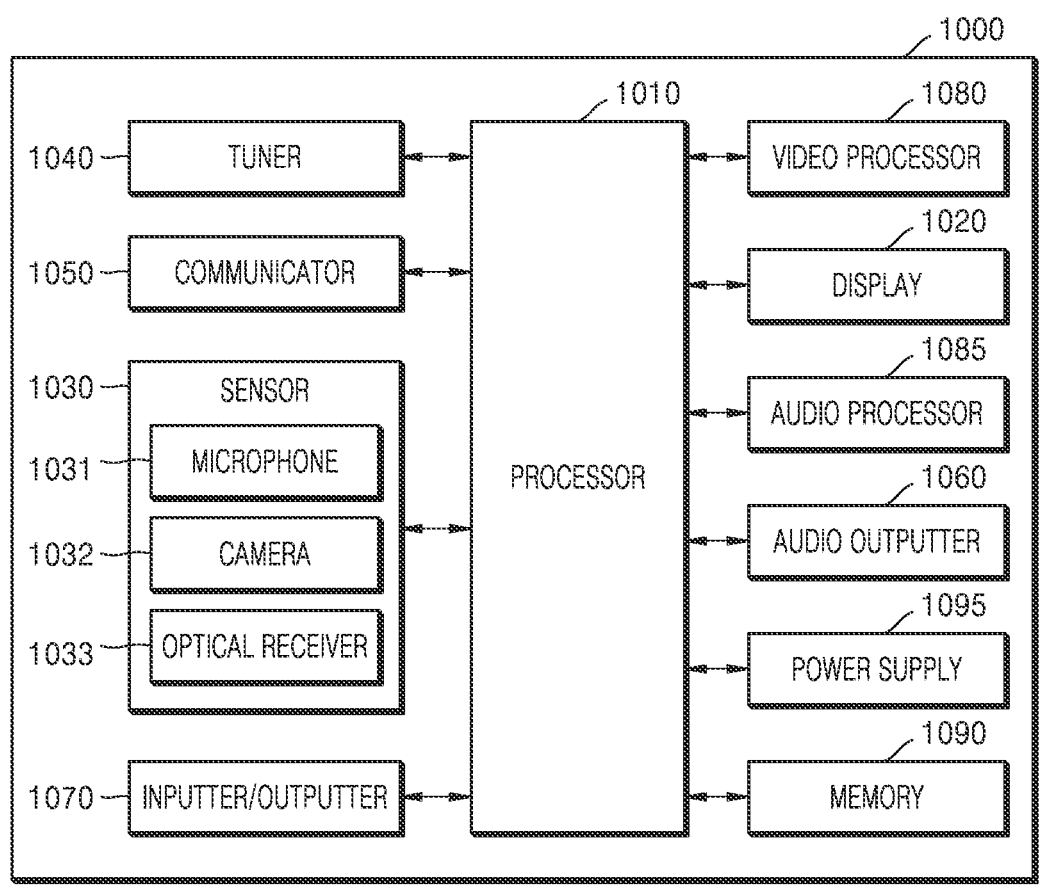
FIG. 11 is a block diagram illustrating an example configuration of a display device according to various embodiments.

FIG. 11 is a block diagram illustrating an example configuration of a display device 1000 according to various embodiments.

Referring to FIG. 11, the display device 1000 of FIG. 11 may be an example of the display device 100 described above with reference to FIGS. 1 to 10.

Referring to FIG. 11, the display device 1000 according to an embodiment of the disclosure may include a tuner 1040, a processor (e.g., including processing circuitry) 1010, a display 1020, a communicator (e.g., including communication circuitry) 1050, a sensor 1030, an inputter/outputter (e.g., including input/output circuitry) 1070, a video processor (e.g., including video processing circuitry) 1080, an audio processor (e.g., including audio processing circuitry) 1085, an audio outputter (e.g., including audio output circuitry) 1060, a memory 1090, and a power supply 1095.

The communicator 1050 of FIG. 11 includes the wireless communicator 110 of FIG. 10, and the inputter/outputter 1070, the processor 1010, the memory 1090, and the display 1020 of FIG. 11 respectively correspond to the inputter/outputter 140, the processor 120, the memory 130, and the display 150 of FIG. 10. Therefore, repeated descriptions thereof may not be provided.

The tuner 1040 according to an embodiment of the disclosure may tune and select only a frequency of a channel to be received by the display device 1000 from among many radio wave components by, for example, amplifying, mixing, or resonating broadcast signals received in a wired or wireless manner. The broadcast signals include audio data, video data, and additional information (e.g., an EPG).

The tuner 1040 may receive the broadcast signals from various sources such as terrestrial broadcasting, cable broadcasting, satellite broadcasting, and Internet broadcasting. The tuner 1040 may receive the broadcast signals from a source such as analog broadcasting or digital broadcasting.

The communicator 1050 may include various communication circuitry and transmit or receive data or signals to or from an external device or a server. For example, the communicator 1050 may include a Wi-Fi module, a Bluetooth module, an IR communication module, a wireless communication module, a local area network (LAN) module, an Ethernet module, or a wired communication module. In this case, each communication module may be implemented as at least one hardware chip.

The Wi-Fi module and the Bluetooth module perform communication using a Wi-Fi method and a Bluetooth method, respectively. When the Wi-Fi module or the Bluetooth module is used, various types of connection information such as a service set identifier (SSID) and a session key may be transmitted and received first, a communication connection may be established using the connection information, and then various types of information may be transmitted and received. The wireless communication module may include at least one communication chip for performing communication according to various wireless communication standards such as Zigbee, $3^{rd}$ Generation (3G), $3^{rd}$ Generation Partnership Project (3GPP), Long Term Evolution (LTE), LTE Advanced (LTE-A), $4^{th}$ Generation (4G), and $5^{th}$ Generation (5G).

The sensor 1030 may include various sensors and detect voice, an image, or interaction of a user, and include a microphone 1031, a camera 1032, and a light receiver 1033.

The microphone 1031 receives voice uttered by the user. The microphone 1031 may convert the received voice into an electrical signal and output the electrical signal to the processor 1010. The voice of the user may include, for example, voice corresponding to a menu or function of the display device 1000.

The camera 1032 may receive an image (e.g., consecutive image frames) corresponding to the user's motion including a gesture in a camera recognition range. The processor 1010 may select a menu displayed on the display device 1000 using the received motion recognition result, or perform a control operation corresponding to the motion recognition result.

The light receiver 1033 receives an optical signal (including a control signal) from an external controller through an optical window (not shown) on a bezel of the display 1020. The light receiver 1033 may receive, from the controller, an optical signal corresponding to a user input (e.g., touch, press, a touch gesture, voice, or motion). A control signal may be extracted from the received optical signal under the control of the processor 1010.

The processor 1010 may include various processing circuitry and controls overall operations of the display device 1000 and the flow of signals between internal elements of the display device 1000, and processes data. When a user input is received or a preset condition is satisfied, the processor 1010 may execute an operating system (OS) and various applications stored in the memory 1090.

The processor 1010 may include random access memory (RAM) storing signals or data input from outside the display device 1000, or used as a storage area corresponding to various operations performed in the display device 1000, read-only memory (ROM) storing a control program for controlling the display device 1000, and a processor.

The video processor 1080 may include various video processing circuitry and processes video data received by the display device 1000. The video processor 1080 may perform various types of image processing, e.g., decoding, scaling, noise filtering, frame rate conversion, and resolution conversion, on the video data.

The audio processor 1085 may include various audio processing circuitry and processes audio data. The audio processor 1085 may perform various types of processing, e.g., decoding, amplification, and noise filtering, on the audio data. Meanwhile, the audio processor 1085 may include a plurality of audio processing modules to process audio data corresponding to a plurality of contents.

The audio outputter 1060 may include various audio outputting circuitry and outputs audio data included in a broadcast signal received through the tuner 1040, under the control of the processor 1010. The audio outputter 1060 may output audio data (e.g., voice or sound) input through the communicator 1050 or the inputter/outputter 1070. In addition, the audio outputter 1060 may output audio data stored in the memory 1090, under the control of the processor 1010. The audio outputter 1060 may include at least one of a speaker, a headphone output port, or a Sony/Philips Digital Interface (S/PDIF) output port.

The power supply 1095 supplies power input from an external power source, to the internal elements of the display device 1000 under the control of the processor 1010. The power supply 1095 may supply power output from one or more batteries (not shown) provided in the display device 1000, to the internal elements under the control of the processor 1010.

The memory 1090 may store various types of data, programs, or applications for driving and controlling the display device 1000, under the control of the processor 1010. The memory 1090 may include a broadcast reception module, a channel control module, a volume control module, a communication control module, a voice recognition module, a motion recognition module, an optical reception module, a display control module, an audio control module, an external input control module, a power control module, a power control module of an external device connected in a wireless manner (e.g., Bluetooth), a voice database (DB), or a motion DB, which is not shown in FIG. 11. The modules and DBs of the memory 1090, which are not shown in FIG. 11, may be implemented in the form of software in the display device 1000 to perform a broadcast reception control function, a channel control function, a volume control function, a communication control function, a voice recognition function, a motion recognition function, an optical reception control function, a display control function, an audio control function, an external input control function, a power control function, or a power control function of an external device connected in a wireless manner (e.g., Bluetooth). The processor 1010 may perform each function using the software stored in the memory 1090.

The block diagrams of the display devices 100 and 1000 illustrated in FIGS. 10 and 11 are merely examples. Elements included in the block diagrams may be integrated, added, or omitted depending on specifications of the implemented display devices 100 and 1000. For example, when necessary, two or more elements may be combined into one element, or one element may be divided into two or more elements. The function performed by each block is merely to describe embodiments of the disclosure, and the specific operation or device thereof does not limit the scope of the disclosure.

A method of operating a display device, according to an example embodiment of the disclosure, may be implemented in the form of program commands executable by various computer means and be recorded on a non-transitory computer-readable medium. The computer-readable medium may include program commands, data files, data structures, or a combination thereof. The program commands recorded on the medium may be those specially designed and configured for the disclosure, or those known to and usable by one of ordinary skill in the art of computer software. Examples of the computer-readable recording medium include magnetic media (e.g., hard disks, floppy disks, and magnetic tape), optical media (e.g., CD-ROMs and DVDs), magneto-optical media (e.g., floptical disks), and hardware devices (e.g., ROMs, RAMs, and flash memories) that are specially configured to store and execute program commands. Examples of the program commands include both machine code, such as produced by a compiler, and high-level language code that are executable by the computer using an interpreter.

The method of operating the display device, according to the disclosed embodiments of the disclosure, may be included and provided in a computer program product. The computer program product may be traded between a seller and a purchaser as a commercial product.

The computer program product may include a software program, and a non-transitory computer-readable storage medium having the software program stored therein. For example, the computer program product may include a product that is electronically distributed in the form of a software program (e.g., a downloadable application) via an electronic device manufacturer or an electronic market. For electronic distribution, at least a part of the software program may be stored in a storage medium or be temporarily generated. In this case, the storage medium may be a storage medium of a server of the manufacturer, a server of the electronic market, or a relay server that temporarily stores the software program.

The computer program product may include a storage medium of a server or a storage medium of a client device in a system including the server and the client device. Otherwise, when a third device (e.g., a smartphone) communicatively connected to the server or the client device is present, the computer program product may include a storage medium of the third device. The computer program product may include a software program itself that is transmitted from the server to the client device or the third device, or from the third device to the client device.

In this case, one of the server, the client device, and the third device may execute the computer program product to perform the method according to the disclosed embodiments of the disclosure. Two or more of the server, the client device, and the third device may execute the computer program product to perform the method according to the disclosed embodiments of the disclosure in a distributed fashion.

For example, the server (e.g., a cloud server or an artificial intelligence (AI) server) may execute the computer program product stored therein, to control the client device communicatively connected to the server, to perform the method according to the disclosed embodiments of the disclosure. While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
    a wireless communicator comprising communication circuitry;
    an inputter/outputter comprising input/output circuitry;
    a display;
    a memory storing one or more instructions; and
    at least one processor configured to execute the one or more instructions stored in the memory to control the display device to:
    receive a power on signal through the wireless communicator or the inputter/outputter;
    display a first screen, in response to the power on signal;
    determine whether a control operation is being performed by a peripheral device based on instruction from a controller corresponding to the peripheral device by analyzing information about a source image received from the peripheral device through the inputter/outputter while the first screen is displayed; and
    close the first screen, and display a second screen comprising the source image, based on determining that the control operation is being performed based on the controller corresponding to the peripheral device.

2. The display device of claim 1, wherein the first screen comprises a home menu screen corresponding to the display device.

3. The display device of claim 1, wherein the at least one processor is further configured to execute the one or more instructions to control the display device to:
    close the first screen and display the second screen, based on a first time elapsing while the first screen is displayed in response to the power on signal received from the peripheral device through the inputter/outputter.

4. The display device of claim 3, wherein the at least one processor is further configured to execute the one or more instructions to control the display device to:
    close the first screen based on a second time elapsing while the first screen is displayed in response to the power on signal received through the wireless communicator, and
    wherein the second time is longer than the first time.

5. The display device of claim 1, wherein the power on signal received through the wireless communicator is received using an infrared (IR) communication method.

6. The display device of claim 5, wherein the inputter/outputter comprises a high-definition multimedia interface (HDMI), and
    wherein the power on signal received through the inputter/outputter is received through HDMI consumer electronics control (CEC).

7. The display device of claim 1, wherein the at least one processor is further configured to execute the one or more instructions to control the display device to:
    determine that the control operation is being performed based on the controller, based on at least one of a change in channel information included in the source image, display of a home menu screen corresponding to the peripheral device, display of a channel change user interface (UI), or display of a volume change UI being detected in the source image.

8. The display device of claim 7, wherein the at least one processor is further configured to execute the one or more instructions to control the display device to:
    detect the change in channel information by recognizing at least one of a logo image, a channel name, a broadcasting station name, or a channel number included in the source image.

9. A method of operating a display device, the method comprising:
    receiving a power on signal through a wireless communicator or an inputter/outputter;
    displaying a first screen in response to the power on signal;
    determining whether a control operation is being performed by a peripheral device based on instruction from a controller corresponding to the peripheral device by analyzing information about a source image received from the peripheral device through the inputter/outputter while the first screen is displayed; and
    closing the first screen and displaying a second screen comprising the source image, based on determining that the control operation is being performed based on the controller corresponding to the peripheral device.

10. The method of claim 9, wherein the first screen includes a home menu screen corresponding to the display device.

11. The method of claim 9, further comprising: closing the first screen and displaying the second screen based on a first time elapsing while the first screen is displayed in response to the power on signal received from the peripheral device through the inputter/outputter.

12. The method of claim 11, further comprising: closing the first screen based on a second time elapsing while the first screen is displayed in response to the power on signal received through the wireless communicator,
    wherein the second time is longer than the first time.

13. The method of claim 9, wherein the power on signal received through the wireless communicator is received using an infrared (IR) communication method.

14. The method of claim 13, wherein the power on signal received through the inputter/outputter is received through high-definition multimedia interface (HDMI) consumer electronics control (CEC).

15. The method of claim 9, wherein the determining of whether the control operation is being performed based on the controller corresponding to the peripheral device comprises: determining that the control operation is being performed based on the controller, based on at least one of a change in channel information included in the source image, display of a home menu screen corresponding to the peripheral device, display of a channel change user interface (UI), or display of a volume change UI being detected in the source image.

16. The method of claim 15, wherein the determining of whether the control operation is being performed based on the controller corresponding to the peripheral device comprises: detecting the change in channel information by recognizing at least one of a logo image, a channel name, a broadcasting station name, or a channel number comprised in the source image.

17. A non-transitory computer-readable recording medium having stored thereon a program for performing the operations of claim 9.

18. The display device of claim 1, wherein analyzing information about the source image includes detecting one or more of whether channel information included in the source image is changed, whether a home menu screen corresponding to the peripheral device is displayed on the source image, whether a channel change U1 is displayed on the source image, or whether a volume change U1 is displayed on the source image.

19. The display device of claim 1, wherein the power on signal is received from the peripheral device, and the at least one processor configured to execute the one or more instructions stored in the memory to control the display device to: identify the peripheral device that transmitted the power on signal.

* * * * *